United States Patent
Hong et al.

(10) Patent No.: US 7,769,231 B2
(45) Date of Patent: Aug. 3, 2010

(54) METHOD AND APPARATUS FOR IMPROVING QUALITY OF IMAGES USING COMPLEMENTARY HUES

(75) Inventors: Ji-young Hong, Yongin-si (KR); Dae-su Chung, Yongin-si (KR); Du-sik Park, Yongin-si (KR); Young-shin Kwak, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 869 days.

(21) Appl. No.: 11/653,914

(22) Filed: Jan. 17, 2007

(65) Prior Publication Data

US 2007/0165946 A1 Jul. 19, 2007

(30) Foreign Application Priority Data

Jan. 17, 2006 (KR) .................. 10-2006-0004928

(51) Int. Cl.
*G06K 9/00* (2006.01)
(52) U.S. Cl. .................. 382/167; 382/163; 358/520
(58) Field of Classification Search .................. 382/167, 382/163, 263; 345/88
See application file for complete search history.

(56) References Cited

U.S. PATENT DOCUMENTS 5,452,018 A * 9/1995 Capitant et al. ............. 348/651
6,724,935 B1 * 4/2004 Sawada et al. ............. 382/167
7,227,990 B2 * 6/2007 Hirao ......................... 382/167
7,468,812 B2 * 12/2008 Fukuda ....................... 358/1.9
2004/0151370 A1 8/2004 Sasaki
2004/0156544 A1 8/2004 Kajihara
2004/0263456 A1 * 12/2004 Miyachi et al. ............... 345/88
2005/0018054 A1 * 1/2005 Kato ....................... 348/222.1

FOREIGN PATENT DOCUMENTS

| JP | 08115430 A | 5/1996 |
| JP | 09055950 A | 2/1997 |
| JP | 09093448 A | 4/1997 |
| JP | 2001-92956 A | 4/2001 |
| JP | 2004312467 A | 11/2004 |
| KR | 100440966 B1 | 7/2004 |

* cited by examiner

*Primary Examiner*—Samir A. Ahmed
*Assistant Examiner*—Ruiping Li
(74) *Attorney, Agent, or Firm*—Sughrue Mion, PLLC

(57) ABSTRACT

A method and apparatus for enhancing the quality of images using complementary color contrast are provided. The method includes (a) extracting color information of each of a plurality of pixels of an input image, (b) determining whether the input image includes both a first pixel belonging to a first group and a second pixel belonging to a second group with reference to the extracted color information, (c) converting a first hue of the first pixel into an optimum point of the first group, and (d) converting a second hue of the second pixel into an optimum point of the second group, wherein the first hue corresponding to the optimum point of the first group and the second hue corresponding to the optimum point of the second group are complementary to each other.

17 Claims, 7 Drawing Sheets

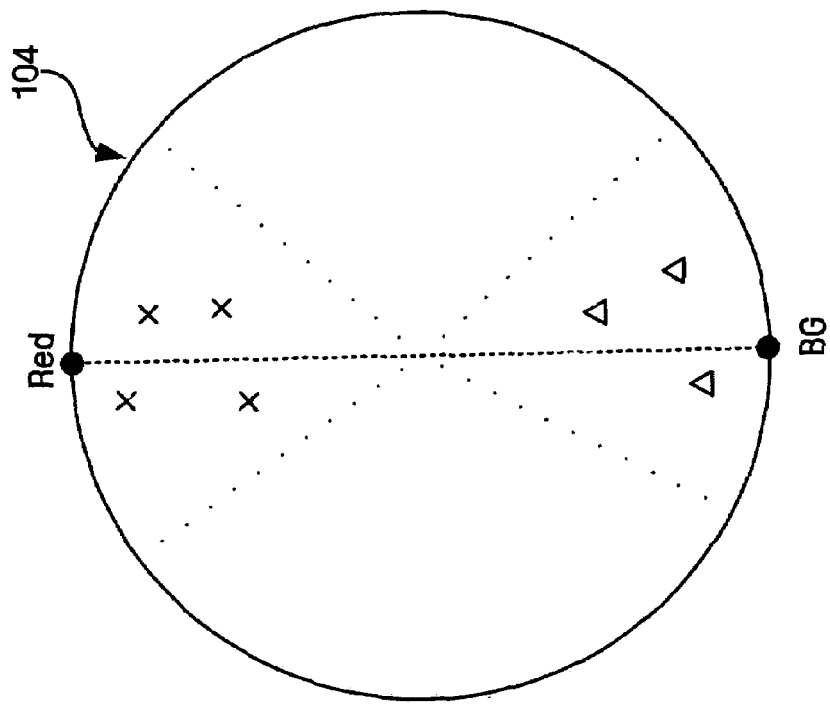
FIG. 3
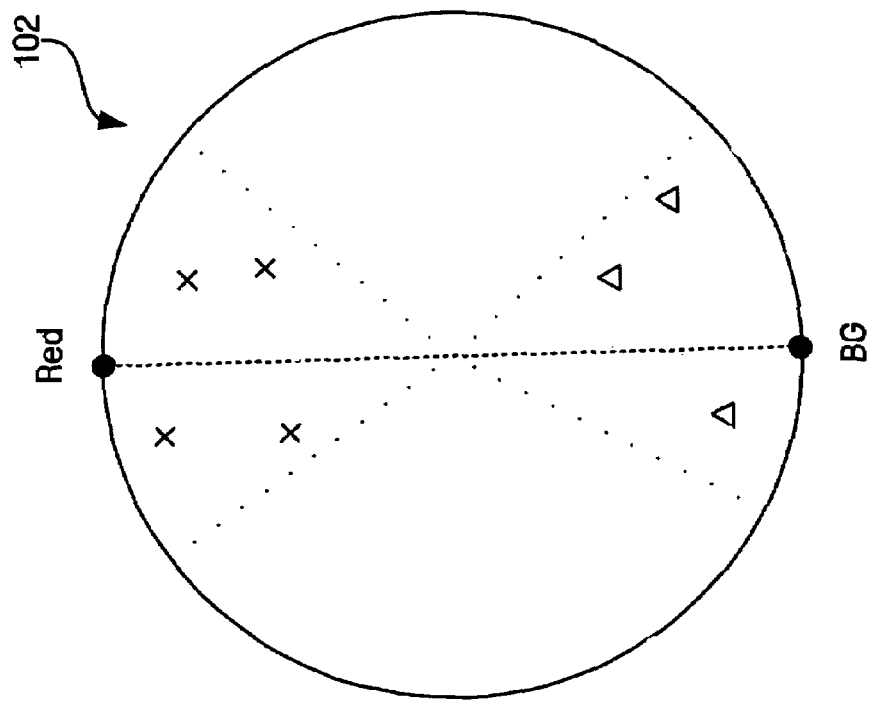

METHOD AND APPARATUS FOR IMPROVING QUALITY OF IMAGES USING COMPLEMENTARY HUES

CROSS-REFERENCE TO RELATED APPLICATION

This application claims priority from Korean Patent Application No. 10-2006-0004928 filed on Jan. 17, 2006 in the Korean Intellectual Property Office, the disclosure of which is incorporated herein by reference in its entirety.

BACKGROUND OF THE INVENTION

1. Field of the Invention

Systems and methods consistent with the present invention relates to hue-conversion of images and, more particularly, to a method and apparatus for improving the quality of images using complementary hues.

2. Description of the Related Art

Methods of improving the quality of still images or moving images through hue conversion have been suggested. Hue conversion is a method of converting color information of input pixels and thus outputting an image having an improved quality from the viewpoint of the human eyes.

Existing methods to convert hues of an image into hues preferred by the human eyes include a preferred hue conversion method and a hue control method. In the preferred hue conversion method, the quality of an image is improved based on a predetermined area in the image. In the hue control method, color information of an image is converted into color information of a predetermined color gamut.

Such conventional hue conversion methods have been suggested for digital hue correction devices which perform hue correction on digital image signals and thus can prevent the quality of images from deteriorating. Also, conventional hue conversion algorithms using stored digital coefficients may be used for extracting a single hue such as a skin tone and altering the extracted hue. However, these conventional hue conversion methods can change only one hue of an image and do not consider the relationship between hues in the image.

Therefore, it is necessary to develop hue conversion methods that consider the relationship between various hues in an image.

SUMMARY OF THE INVENTION

The present invention provides a method and apparatus for improving the quality of images using complementary hues.

The present invention also provides a method and apparatus for converting color information of pixels of an image within a predefined color gamut while not intruding into color gamuts other than the predefined color gamut.

However, the aspects of the present invention are not restricted to those set forth herein. The above and other aspects of the present invention will become more apparent to one of ordinary skill in the art to which the present invention pertains by referencing a detailed description of the present invention given below.

According to an aspect of the present invention, there is provided a method of improving the quality of images using complementary color contrast. The method includes (a) extracting color information of each of a plurality of pixels of an input image, (b) determining whether the input image includes both a first pixel belonging to a first group and a second pixel belonging to a second group with reference to the extracted color information, (c) converting a first hue of the first pixel into an optimum point of the first group, and (d) converting a second hue of the second pixel into an optimum point of the second group, wherein the first hue corresponding to the optimum point of the first group and the second hue corresponding to the optimum point of the second group are complementary to each other.

According to another aspect of the present invention, there is provided an apparatus for improving the quality of images using complementary color contrast. The apparatus includes an image input module which extracts color information of each of a plurality of pixels of an input image; a color gamut determination module which determines whether the input image includes both a first pixel belonging to a first group and a second pixel belonging to a second group with reference to the extracted color information; and a hue conversion module which converts a first hue of the first pixel into an optimum point of the first group, and converts a second hue of the second pixel into an optimum point of the second group, wherein the first hue corresponding to the optimum point of the first group and the second hue corresponding to the optimum point of the second group are complementary to each other.

BRIEF DESCRIPTION OF THE DRAWINGS

The above and other aspects of the present invention will become more apparent by describing in detail exemplary embodiments thereof with reference to the attached drawings in which:

FIG. 3 is a diagram for explaining results of hue conversion using complementary hues according to an exemplary embodiment of the present invention;

DETAILED DESCRIPTION OF EXEMPLARY EMBODIMENTS OF THE INVENTION

Figure 1:
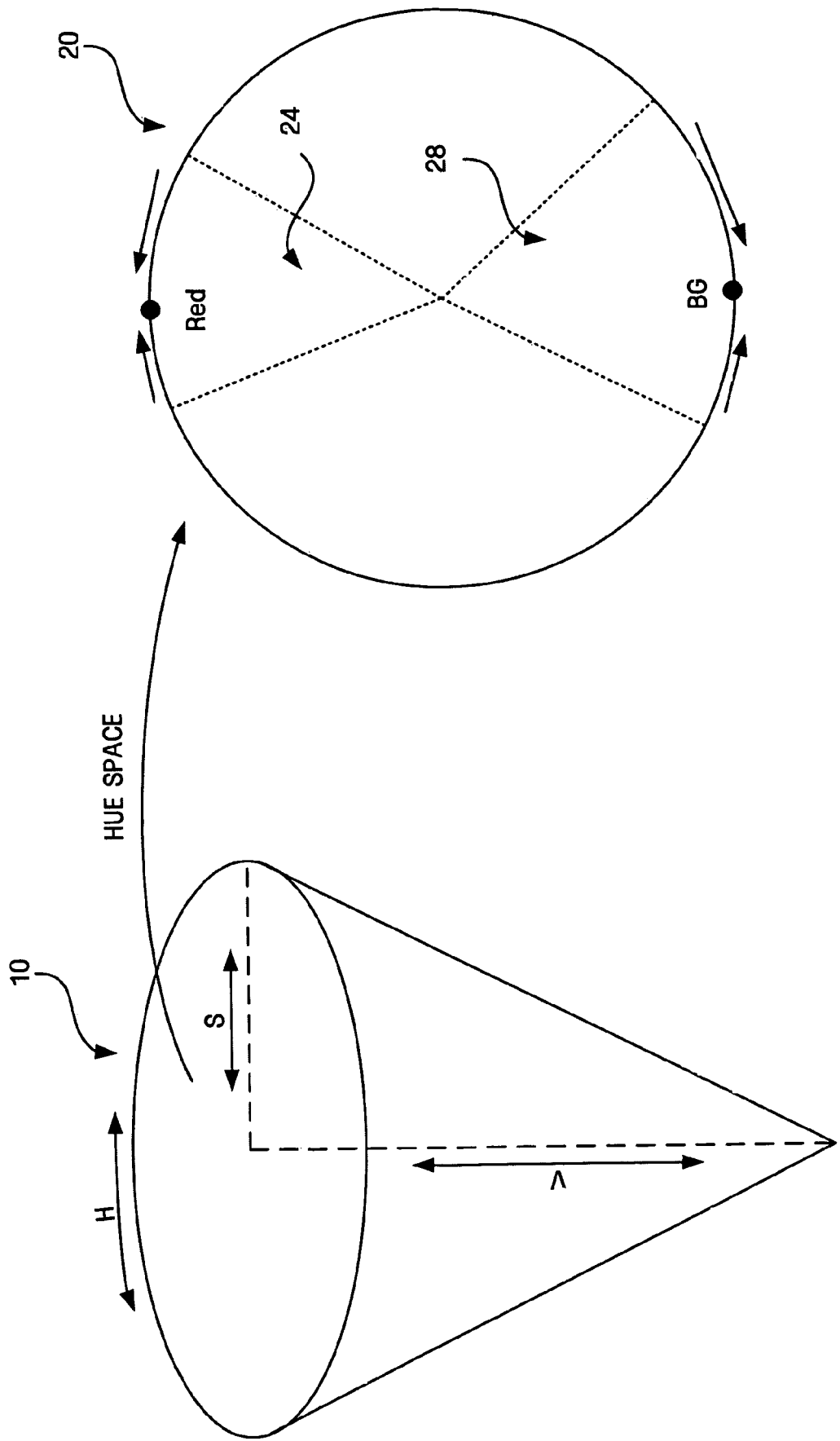
FIG. 1 is a diagram for explaining hue shift in a hue-saturation-value (HSV) color space according to an exemplary embodiment of the present invention.

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art. Like reference numerals in the drawings denote like elements, and thus their description will be omitted.

A method and apparatus for improving the quality of images using complementary hues according to the present invention is described hereinafter with reference to flowchart illustrations of user interfaces, methods, and computer program products according to embodiments of the invention. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks.

These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

In general, in order to provide vivid images, complementary hues which are a type of hue matching are used. Complementary hues are hues that lie directly opposite each other on the hue wheel, and the contrast between a pair of complementary hues is referred to as complementary hue contrast.

Conventional image processing methods aim at rendering objects in hues that are almost indistinguishable from the original hues of the objects by properly realizing images in response to input signals. However, the present invention aims at maximizing visual satisfaction by processing images using complementary hues. In addition, in conventional image processing methods, only predetermined hues can be converted, or an entire color gamut is converted. However, according to the present invention, it is possible to enhance the quality of an image by simultaneously shifting a pair of complementary hues that contrast each other according to a set of rules.

FIG. 1 is a diagram for explaining hue shift in a hue-saturation-value (HSV) color space 10. Referring to FIG. 1, hue may be computed separately from saturation and value. Even though there are a variety of color spaces other than an HSV color space such as an red-green-blue (RGB) color space, a cyan-magenta-yellow-black (CMYK) color space, and a YUV color space, the present invention will hereinafter be described focusing more on an HSV color space.

Referring to FIG. 1, hue shift in the HSV color space 10, which is three-dimensional, is performed by shifting a hue in a hue domain 20.

A pair of hues that are located opposite each other on Munsell's hue wheel are defined as being complementary, and then, pairs of complementary hues defined by Munsell are represented within the hue range 20. In this case, the complementary hue of red is blue green (BG).

According to an exemplary embodiment, a pair of complementary hues may be used as target hues so that hues within the color gamut (hereinafter referred to as the complementary color gamut) of each of the complementary hues are converted into the target hue of the corresponding complementary color gamut. Thereafter, if the hues of a plurality of pixels of an input image respectively belong to the complementary color gamuts, the hues of the plurality of pixels of the input image may be shifted toward their respective optimum points, i.e., the respective target hues of the complementary color gamuts, wherein the amount by which the hue of each of the plurality of pixels of the input image is shifted is proportional to the distance between the corresponding pixel hue and a target hue toward which the corresponding pixel hue is shifted. Hues within a red gamut 24 of the hue domain 20 are all converted into a target hue of the red gamut 24, and hues within a BG gamut 28 of the hue domain 20 are all converted into a target hue of the BG gamut 28. According to the exemplary embodiment, two hues that are complementary to each other are simultaneously shifted to their respective optimum points (i.e., target hues), instead of shifting only a predetermined hue.

Figure 2:
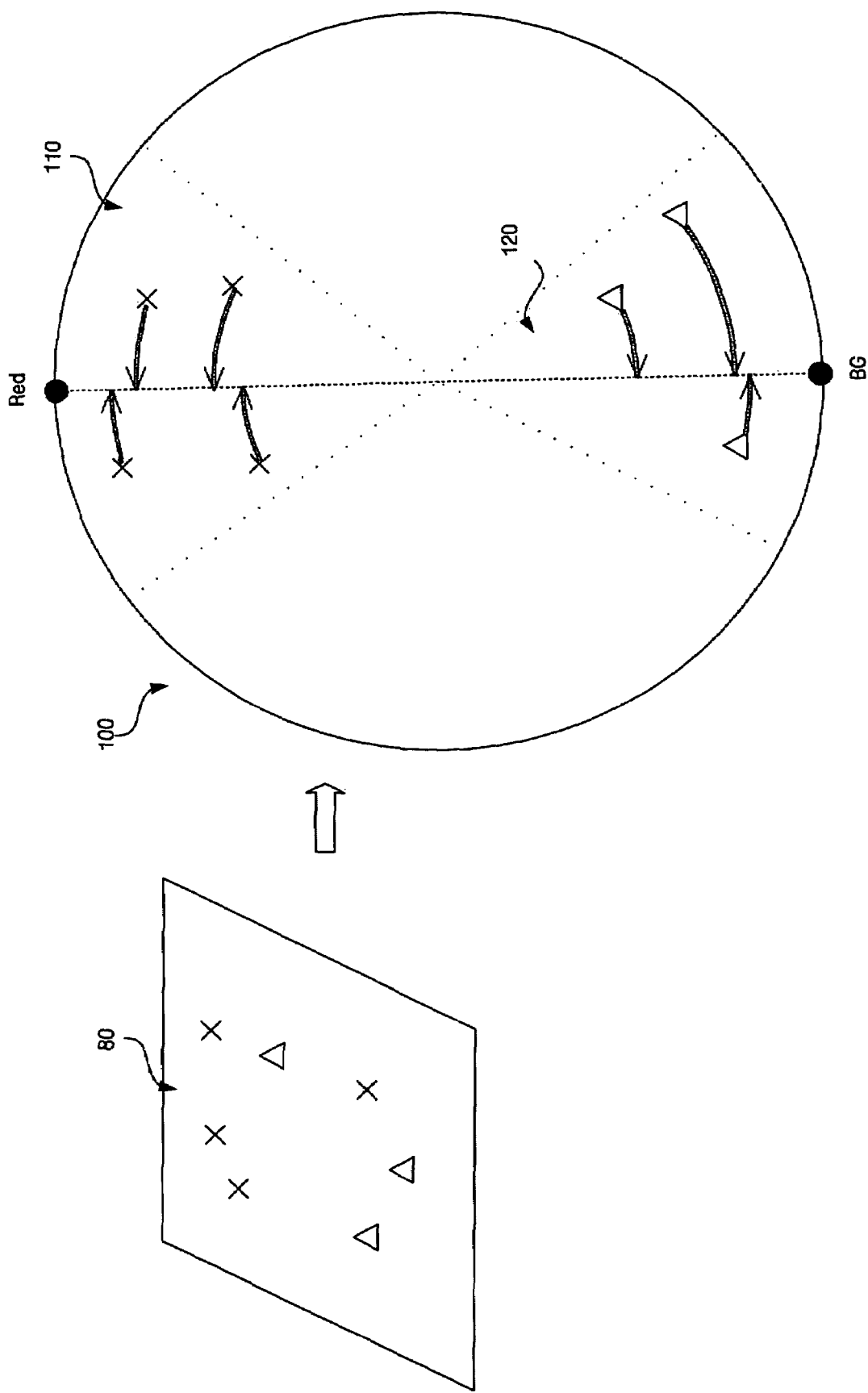
FIG. 2 is a diagram for explaining hue conversion using complementary hue contrast according to an exemplary embodiment of the present invention.

FIG. 2 is a diagram for explaining a hue conversion method using complementary hue contrast according to an exemplary embodiment of the present invention. Referring to FIG. 2, an input image 80 may comprise a plurality of color pixels. Of the color pixels of the input image 80, those which belong to a red gamut 110 are marked by reference character X, and those which belong to a BG gamut 120 are marked by reference character Δ. Since the input image 80 comprises color pixels respectively belonging to two predefined color gamuts (e.g., the red and BG gamuts 110 and 120), the hue conversion method using complementary hues can be performed on the color pixels respectively belonging to the red gamut 110 and the BG gamut 120.

In detail, four pixels of the input image 80 belonging to the red gamut 110 are all converted into a target hue of the red gamut 110. Three pixels of the input image 80 belonging to the BG gamut 120 are all converted into a target hue of the BG gamut 120. Hue conversion may be performed on these seven pixels of the input image 80 according to the distances between the hues of the seven pixels and their respective target hues. The amount by which a pixel of the input image 80 is shifted through hue conversion may be determined according to the distance between the pixel of the pixel and a target hue into which the pixel is converted. According to the exemplary embodiment, pixels whose hues are complementary to each other are hue-converted, thereby realizing a clear image.

If the input image 80 does not comprise any pixels belonging to the BG gamut 120 but comprises pixels belonging to the red gamut 110, or if the input image 80 does not comprise any pixels belonging to the red gamut 100 but comprises pixels belonging to the BG gamut 120, hue conversion may be performed on the input image 80 using a method other than the one set forth herein, or no hue conversion may be performed on the input image 80.

Complementary hue relationships and complementary color gamuts needed for hue-converting a plurality of pixels of an input image may be determined in advance or may be chosen by a user.

FIG. 3 is a diagram illustrating hue conversion results obtained by using a hue conversion method using complementary hues according to an exemplary embodiment of the present invention. Specifically, FIG. 3 illustrates hue conversion results obtained by using the hue conversion method described above with reference to FIG. 2. Referring to FIG. 3, reference characters X and Δ represent pixels. When hue conversion is performed on the pixels in a hue domain 102 using the hue conversion method of FIG. 2, the pixels are shifted toward their respective target hues, and the resulting pixel distribution is illustrated in a hue domain 104.

Figure 4:
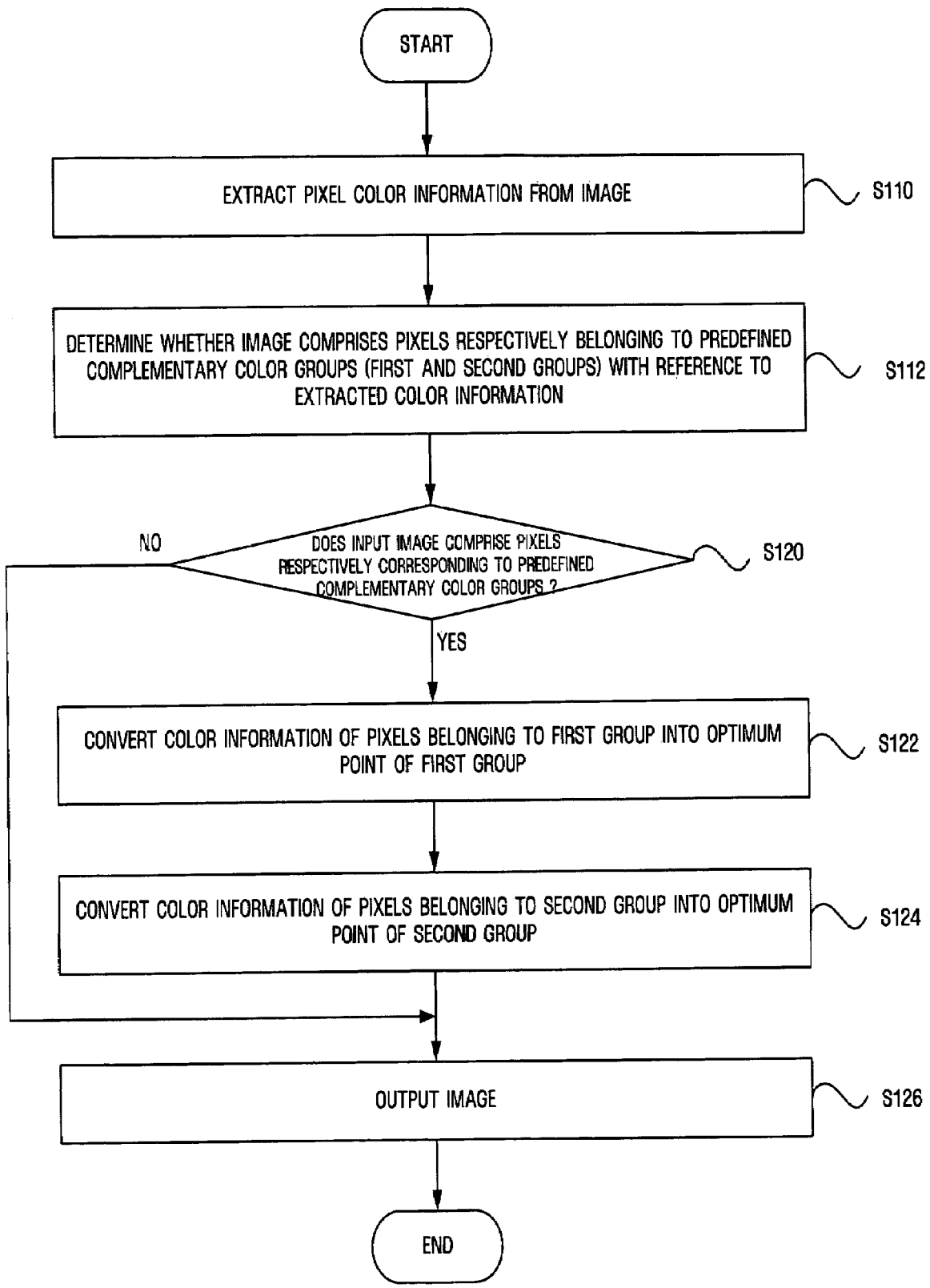
FIG. 4 is a flowchart illustrating a method of converting color information of pixels of an image using complementary hues according to an exemplary embodiment of the present invention.

FIG. 4 is a flowchart illustrating a method of converting color information of an image using complementary hues according to an exemplary embodiment of the present invention. Specifically, FIG. 4 illustrates the converting of color information of pixels respectively belonging to a pair of pre-defined complementary hue groups (e.g., first and second groups) and the outputting of the results of the conversion.

Referring to FIG. 4, in operation S110, color information of a plurality of pixels of an input image or a stored image is extracted. The type of the extracted color information may vary according to the type of hue system or method provided by the input image or the stored image. For example, the extracted color information may be RGB information, YUV information, or HSV information.

In operation S112, the pixels of the input image or the stored image are examined using the extracted color information for whether the pixels of the input image or the stored image respectively belong to the predefined complementary hue groups. The predefined complementary hue groups may comprise a first group, e.g., the red gamut 110 illustrated in FIG. 2, and a second group, e.g., the BG gamut 120 illustrated in FIG. 2. In detail, the pixels of the input image or the stored image are examined for whether they respectively belong to the first and second groups, respectively. Then, if the results of the examination indicate that the input image or the stored image comprises at least two pixels respectively belonging to the first group and the second group, hue conversion using complementary hues may be performed on the input image or the stored image. However, the present invention is not restricted to this. In other words, hue conversion using complementary hues may be performed on the input image or the stored image when the ratio of the number of pixels of the input image or the stored image belonging to the first group and the number of pixels of the input image or the stored image belonging to the second group reaches a predetermined value. For example, hue conversion using complementary hues may be performed on the input image or the stored image if the difference between the number of pixels of the input image or the stored image belonging to the first group and the number of pixels of the input image or the stored image belonging to the second group is less than 10%. In this case, when the number of pixels of the input image or the stored image belonging to the first group is 100 and the number of pixels of the input image or the stored image belonging to the second group is 20, hue conversion other than the one set forth herein may be performed on the input image or the stored image because the number of pixels of the input image or the stored image belonging to the first group is too much greater than the number of pixels of the input image or the stored image belonging to the second group.

Alternatively, the number of pixels of the input image or the stored image belonging to either the first or second group may be compared with the total number of pixels of the input image or the stored image, and it may be determined whether to perform hue conversion using complementary hues on the input image or the stored image according to the results of the comparison. For example, if the total number of pixels of the input image or the stored image is three million and the number of pixels of the input image or the stored image belonging to either the first or second group is only 30, hue conversion may not be performed on the input image or the stored image.

Still alternatively, it may be determined whether to perform hue conversion using complementary hues on the input image or the stored image according to the number of pixels of the input image or the stored image respectively belonging to the first and second groups or according to how much the pixels of the input image or the stored image included in each of the first and second groups are associated with one another.

In operation S120, it is determined whether the input image or the stored image comprises pixels respectively belonging to the first and second groups. In operation S122, if the input image or the stored image is determined in operation S120 to comprise pixels respectively belonging to the first and second groups, color information of the pixels included in the first group is converted to an optimum point in the first group. Thereafter, in operation S124, color information of the pixels included in the second group is converted to an optimum point in the second group. In operation S126, the results of the conversion performed in operations S122 and S124 are output.

In operation S126, if it is determined in operation S120 that none of the pixels of the input image or the stored image belong to the first or second group, the input image or the stored image is output without performing hue conversion on the input image or the stored image.

If, in operation S110, pixel hues are extracted from the input image or the stored image, it may be determined whether the extracted pixel hues are complementary to each other by appropriately converting the extracted pixel hues. For example, if the extracted pixel hues are RGB hues, the extracted pixel hues may be converted into HSV hues, and it may be determined whether the HSV hues are complementary to each other. Thereafter, hue conversion may be performed on the input image or the stored image using an HSV method according to whether the HSV hues are complementary to each other. Thereafter, the HSV hues may be converted back into RGB hues and stored before the outputting of the HSV hues.

Figure 5:
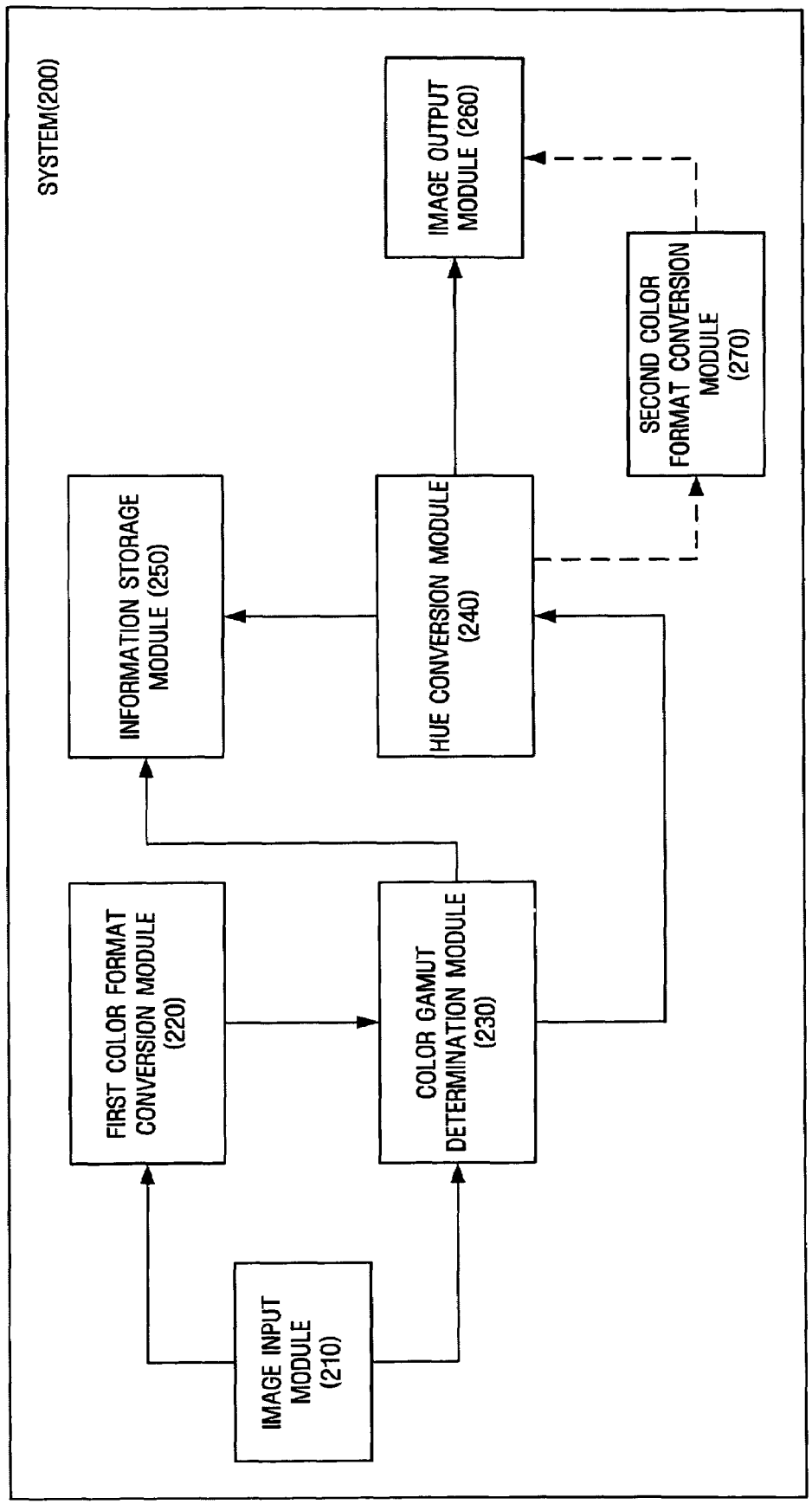
FIG. 5 is a block diagram of a system that converts a hue of an input image using the complement of the hue according to an exemplary embodiment of the present invention.

FIG. 5 is a block diagram of a system 200 that hue-converts an input image using complementary hues according to an embodiment of the present invention.

The term 'module' or 'table', as used herein, means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

Referring to FIG. 5, an image input module 210 receives an image to be hue-converted from an external source. The image input module 210 may receive an image via a network or may receive and use stored image data. The image input module 210 extracts color information from the received image and allows the system 200 to use the extracted color information. If the color format of the received image is different from a format used by the system 200 to perform color gamut determination and hue conversion, the color format of the received image may need to be appropriately converted. For this, a first color format conversion module 220 converts the received image from one color format to another. For example, the first color format conversion module 220 may convert the received image from an RGB format to an HSV format and vice versa, and may convert the received image from a YUV format to an HSV or RGB format and vice versa. The color formats that can be handled by the first color format conversion module 220 may be altered according to the color formats used by the system 200.

A color gamut determination module 230 determines whether the received image comprises pixels respectively belonging to a pair of complementary color gamuts which are stored in an information storage module 250. According to an exemplary embodiment, assuming that the complementary color gamuts include a first group and a second group, it may be determined whether to perform hue conversion using complementary hues on the received image according to the number of pixels of the received image belonging to the first group and the number of pixels of the received image belonging to the second group, or according to the ratio of the number of pixels of the received image belonging to the first group and the number of pixels of the received image belonging to the second group.

The information storage module 250 stores color gamut information indicating which of a plurality of hue groups are to be used as complementary color gamuts, target information indicating how pixels in each of the complementary color gamuts are to be hue-converted, and information needed to convert the hues of pixels into their respective target hues, for example, strength information, wherein the strength information specifies how much the hues of pixels are to be shifted toward their respective target hues or indicates whether the hues of pixels are to be shifted toward their respective target hues in a proportional manner or not. The color gamut information may be stored in the information storage module 250 when the system 200 is realized, and the type of the color gamut information may be altered according to user settings. The information storage module 250 may include a plurality of pairs of complementary hue groups other than a complementary hue group pair comprising a red gamut and a BG gamut. Each of the complementary hue groups stored in the information storage module 250 comprises its own target hue information.

For example, assuming that there are three complementary hue pairs, i.e., A-B, C-D, and E-F, there are six color gamuts respectively corresponding to A, B, C, D, E, and F, and six pieces of target hue information respectively corresponding to A, B, C, D, E, and F.

A hue conversion module 240 hue-converts one or more pixels of the received image which need to be hue-converted using the target hue information and the strength information stored in the information storage module 250. If the hues of the pixels that need to be hue-converted are in an HSV format, the hue conversion module 240 may shift the hues of the pixels that need to be hue-converted as illustrated in FIG. 3. The results of the hue conversion performed by the hue conversion module 240 may be output by an image output module 260. The results of the hue conversion performed by the hue conversion module 240 may be selectively converted by a second color format conversion module 270, and the results of the conversion performed by the second color format conversion module 270 may be output by the image output module 260. The color format of the pixels that need to be hue-converted may be appropriately converted by the first color format conversion module 220, hue conversion may be performed on the resulting pixels by the hue conversion module 240, the color format of the results of the hue conversion performed by the hue conversion module 240 may be converted back into the color format of the pixels of the original received image by the second color format conversion module 270, and the results of the conversion performed by the second color format conversion module 270 may be output by the image output module 260.

The pixels of the received image that are not subjected to hue conversion according to the results of the determination performed by the color gamut determination module 230 may be output by the image output module 260 as they are. Also, the color format of all the pixels of the received image may be converted by the first color format conversion module 220, and the results of the conversion performed by the first color format conversion module 220 may be converted back into the color format of the pixels of the original received image.

The system 200 illustrated in FIG. 5 can be applied to mobile phones, laptop computers, TVs, personal digital assistants (PDAs), computers, and other devices equipped with a software program for outputting or converting images.

Figure 6:
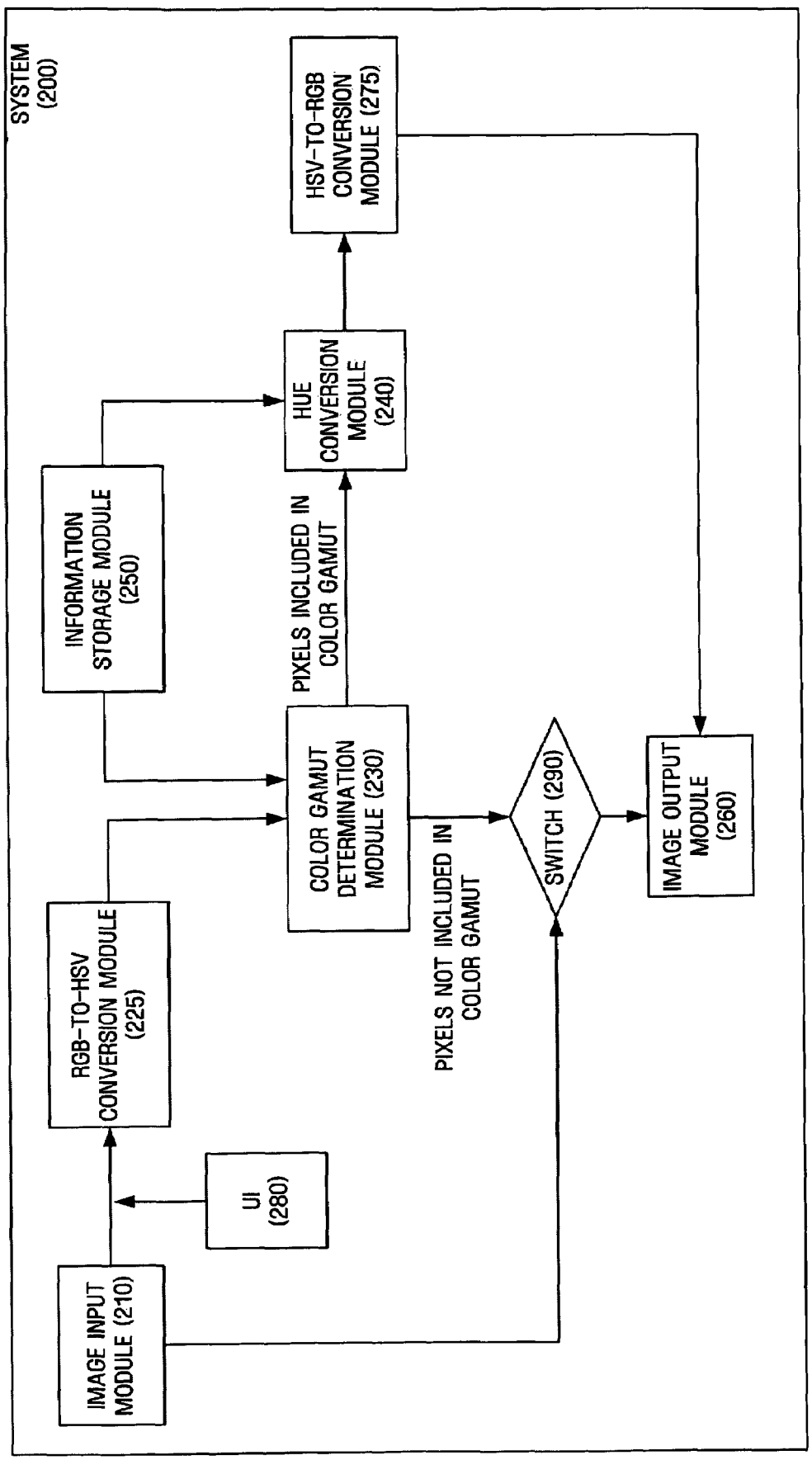
FIG. 6 is a block diagram of a system that receives RGB image data, converts the RGB image data into HSV image data, and performs hue conversion on the HSV image data according to an exemplary embodiment of the present invention.

FIG. 6 is a block diagram of a system 200 that receives RGB image data, converts the RGB image data into HSV image data, and performs hue conversion on the HSV image data according to an exemplary embodiment of the present invention. The structure of the system 200 illustrated in FIG. 6 is similar to the structure of the system illustrated in FIG. 5. Referring to FIG. 6, an RGB-to-HSV conversion module 225 converts an RGB image into an HSV image. Likewise, an HSV-to-RGB conversion module 275 converts an HSV image obtained by hue conversion into an RGB image.

Pixels that are not determined to belong to predetermined color gamuts by a color gamut determination module 230 are directly output via a switch 290 without being subjected to RGB-to-HSV conversion or HSV-to-RGB conversion.

A user interface (UI) 280 may provide a list of sensibility adjectives, image samples to which complementary hue contrast is applied, or defaults, and allows a user to choose a hue conversion method according to his or her preferences. The sensibility adjective list stores a complementary color gamut that can provide clearness and vividness according to how the human vision perceives hues is stored, and the user is allowed to determine the strength of hue conversion to be performed with reference to the sensibility adjective list. Also, image samples to which complementary hue contrast is applied are provided, thereby enabling the user to compare an image yet to be hue-converted with an already hue-converted image and to easily decide whether to perform hue conversion. The user may input a hue conversion strength to the system 200. Hue conversion strength is associated with how much a hue is to be shifted toward a target hue and how wide a color gamut subjected to hue conversion is to be set.

The information storage module 250 stores information associated with a plurality of parameters needed to perform hue conversion, for example, hue boundary information, strength information, and target point information.

A color gamut is a predefined hue range. For example, a red gamut is defined as the ranges of 0°-22° and 336°-360° in an HSV color space. Target hue information comprises information regarding target hues into which the hues of color pixels are to be respectively converted. A plurality of unique target hues may be respectively defined for a plurality of color gamuts.

The color gamut determination module 230 determines whether a given input image belongs to a color gamut stored in the information storage module 250.

For example, when H1<H<H2 where H represents the hues of a plurality of pixels the given input image and H1 and H2 represent a maximum hue and a minimum hue in the color gamut stored in the information storage module 250, the given input image may be subjected to hue shift. In other words, it is determined whether the hues of the pixels of the given input image are within the color gamut stored in the information storage module 250, and it is determined whether to perform hue conversion according to whether the hues of the pixels of the given input image are within the color gamut stored in the information storage module 250.

The hue conversion module 240 measures the distance between the hue of each of the pixels of the given input image and a target hue, and arbitrarily adjusts hue conversion strength between the range of 0-1.

Hue conversion performed by the hue conversion module 240 may be represented by Equation (1):

$$\text{if } H_{in} < H_c, H_{out} = H_c - (H_c - H_{in})^2 \cdot \frac{s}{H_{width}} - (1-s) \cdot (H_c - H_{in})$$

$$\text{if } H_{in} > H_c, H_{out} = H_c + (H_{in} - H_c)^2 \cdot \frac{s}{H_{width}} - (1-s) \cdot (H_{in} - H_c)$$

(1)

where $H_{in}$ represents the hue of an input image, $H_c$ represents a target hue defined for a color gamut, $H_{out}$ represents an output hue, $H_{width}$ represents the difference between the target hue $H_c$ and a lower boundary ($H_{in}<H_c$) of the color gamut or between the target hue $H_c$ and an upper boundary ($H_{in}>H_c$) of the color gamut, and S represents hue conversion strength.

Of the pixels of the given input image, those which are determined to satisfy a given condition by the color gamut determination module 230 are transmitted to the hue conversion module 240, and those which are not determined to satisfy the given condition by the color gamut determination module 230 are directly output as they are. The switch 290 is used to output the pixels of the given input image which do not satisfy the given condition as they are.

If there is no additional user input or if the user interface 280 is not included in the system 200, hue conversion may be performed using default values of the system 200.

Figure 7:
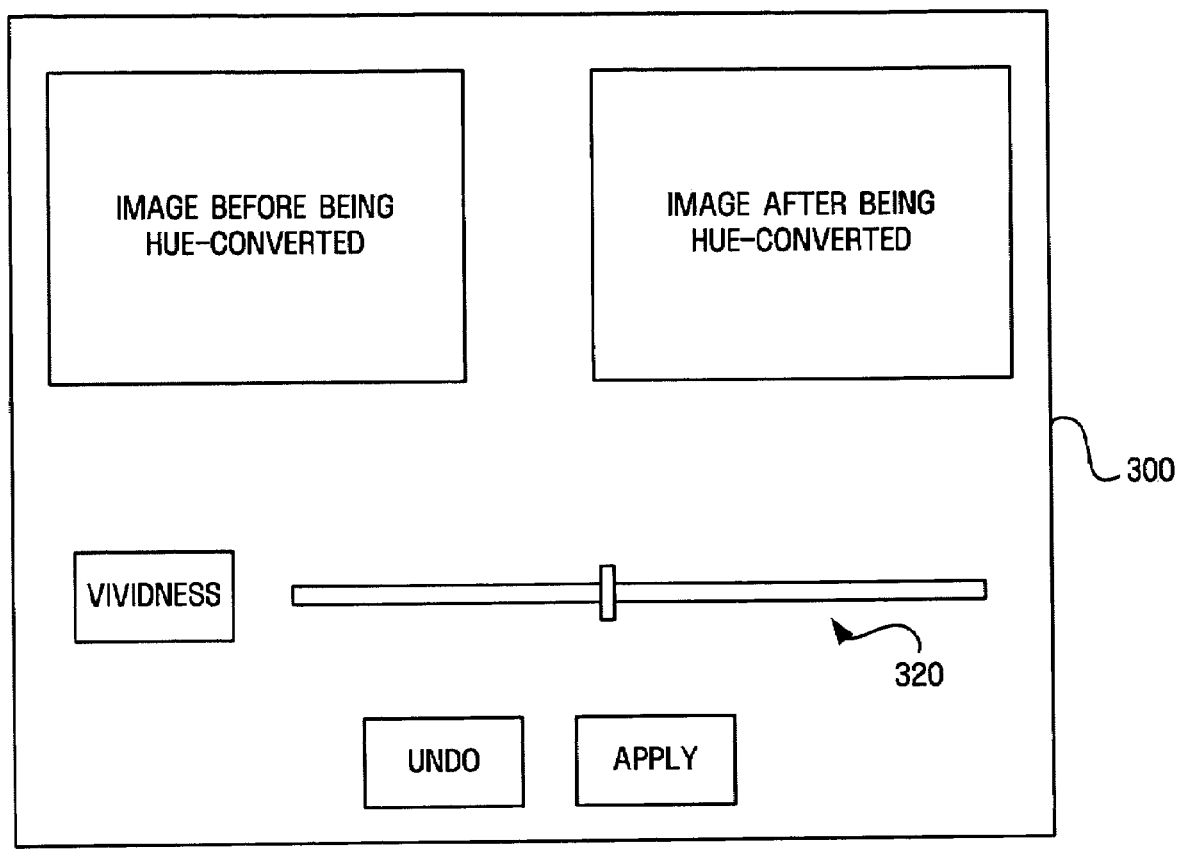
FIG. 7 is a diagram of a user interface that converts hues using complementary hues according to an exemplary embodiment of the present invention.

FIG. 7 is a diagram illustrating a user interface 300 that converts hues using complementary colors according to an exemplary embodiment of the present invention. Referring to FIG. 7, a hue conversion method according to an exemplary embodiment of the present invention can be used in digital cameras, TVs, computers, mobile phones, and laptop computers and can be applied to other devices that output images. A user can adjust settings using complementary color data that is defined in advance by a system. For example, a plurality of pairs of complementary color groups may be provided in order to represent clear and vivid images. In order to adjust the vividness of images, color gamuts may be set wide or narrow, and the degree of hue conversion may also be set. If the degree to which the hues of pixels are to be shifted is set high, the hues of the pixels may be shifted through hue conversion to gather around their respective target hues. In this manner, it is possible to provide clear images.

Referring to FIG. 7, a slide bar 320 may be used to adjust the sizes of the red gamut 110 and the BG gamut 120 illustrated in FIG. 2 and to adjust the amount by which the hues of pixels are to be shifted, as illustrated in FIG. 3.

The results of settings adjustment performed using the user interface 300 may be stored in an information storage module so that they can be used later again.

According to the present invention, it is possible to realize clear and vivid images by appropriately hue-converting pixels of an image within a predefined color gamut while not intruding into gamuts other than the predefined color gamut.

In addition, according to the present invention, it is possible to maximize a user's subjective visual satisfaction with images by enhancing the quality of images using complementary color contrast and representing images in hues that are deemed preferable according to human experiences.

Moreover, it is possible to provide a user with visual satisfaction by shifting two hues to their respective target hues.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of improving the quality of images using complementary color contrast, the method comprising:
   (a) extracting color information of each of a plurality of pixels of an input image;
   (b) determining whether the input image comprises both a first pixel belonging to a first group and a second pixel belonging to a second group with reference to the extracted color information;
   (c) converting a first hue of the first pixel into an optimum point of the first group; and
   (d) converting a second hue of the second pixel into an optimum point of the second group,
   wherein the first hue corresponding to the optimum point of the first group and the second hue corresponding to the optimum point of the second group are complementary to each other.

2. The method of claim 1 further comprising, after (a), converting the extracted color information to a hue-saturation-value (HSV) color space.

3. The method of claim 1, wherein (b) comprises comparing the extracted color information with information regarding the first group and determining whether each of the pixels of the input image belongs to the first group according to the results of the comparison.

4. The method of claim 1, wherein (c) comprises:
   determining the distance between the hue of the first pixel and the optimum point of the first group; and
   shifting the hue of the first pixel toward the optimum point of the first group by a predetermined amount, wherein the predetermined amount is proportional to the distance between the hue of the first pixel and the optimum point of the first group.

5. The method of claim 1 further comprising, after (d), converting the extracted color information into color information having a red-green-blue (RGB) format.

6. The method of claim 1, wherein the extracted color information is based on an HSV color space, and color information of the optimum point of the first group and color information of the optimum point of the second group are defined as being complementary to each other in the HSV color space.

7. The method of claim 1 further comprising, after (a), adjusting the sizes of the first group and the second group.

8. The method of claim 1 further comprising, after (b), adjusting hue conversion strength to convert the hue of the first pixel into the optimum point of the first group.

9. An apparatus for improving the quality of images using complementary color contrast, the apparatus comprising:
- an image input module which extracts color information of each of a plurality of pixels of an input image;
- a color gamut determination module which determines whether the input image comprises both a first pixel belonging to a first group and a second pixel belonging to a second group with reference to the extracted color information; and
- a hue conversion module which converts a first hue of the first pixel into an optimum point of the first group, and converts a second hue of the second pixel into an optimum point of the second group,
- wherein the first hue corresponding to the optimum point of the first group and the second hue corresponding to the optimum point of the second group are complementary to each other.

10. The apparatus of claim 9 further comprising a color format conversion module which converts the extracted color information to a hue-saturation-value (HSV) color space.

11. The apparatus of claim 9, wherein the color gamut determination module compares the extracted color information with information regarding the first group and determines whether each of the pixels of the input image belongs to the first group according to the results of the comparison.

12. The apparatus of claim 9, wherein the hue conversion module determines a distance between the hue of the first pixel and the optimum point of the first group, and shifts the hue of the first pixel toward the optimum point of the first group by a predetermined amount, wherein the predetermined amount is proportional to a distance between the hue of the first pixel and the optimum point of the first group.

13. The apparatus of claim 9, wherein the color format conversion module converts the extracted color information into color information having a red-green-blue (RGB) format.

14. The apparatus of claim 9, wherein the extracted color information is based on an HSV color space, and color information of the optimum point of the first group and color information of the optimum point of the second group are defined as being complementary to each other in the HSV color space.

15. The apparatus of claim 9 further comprising an information storage module which stores color gamut information regarding the first group and the second group, and optimum point information regarding the optimum point of the first group and the optimum point of the second group.

16. The apparatus of claim 15 further comprising a user interface which modifies the color gamut information and the optimum point information stored in the information storage module.

17. A non-transitory computer-readable recording medium storing a computer program for executing the method of claim 1.

* * * * *